United States Patent [19]

Zathan

[11] 4,276,454

[45] Jun. 30, 1981

[54] WATER LEVEL SENSOR

[76] Inventor: William J. Zathan, 1883-2 Pepper Valley La., El Cajon, Calif. 92021

[21] Appl. No.: 21,691

[22] Filed: Mar. 19, 1979

[51] Int. Cl.³ .............................................. H01H 29/00
[52] U.S. Cl. ............................... 200/61.05; 73/304 R; 324/61 P; 340/620
[58] Field of Search .......................... 200/61.04, 61.05; 340/620; 73/304R, 304 C; 324/61 P; 361/284

[56] References Cited

U.S. PATENT DOCUMENTS

| | | | |
|---|---|---|---|
| 2,925,101 | 2/1960 | Dunham | 340/620 |
| 3,131,335 | 4/1964 | Berglund et al. | 73/304 R |

*Primary Examiner*—J. V. Truhe
*Assistant Examiner*—Morris Ginsburg
*Attorney, Agent, or Firm*—Ralph S. Branscomb

[57] ABSTRACT

The invention is a bi-level fluid level sensor intended to be used in the bilges of boats with complementary equipment which activates emergency equipment such as warning devices and/or pumps when the upper level is reached, and deactivates such equipment when the lower level is reached. The sensor is uniquely constructed of three specially coated water repellent probe elements which are received in a socket which is in turn imbedded in a molded body of plastic or the like to absolutely seal the sensing unit against corrosion and mitigate against the accidental bridging of the probes by oil slicks and bilge slime.

1 Claim, 12 Drawing Figures

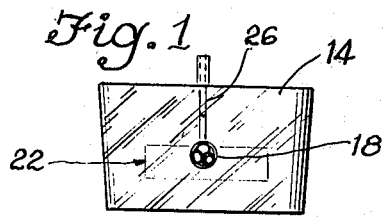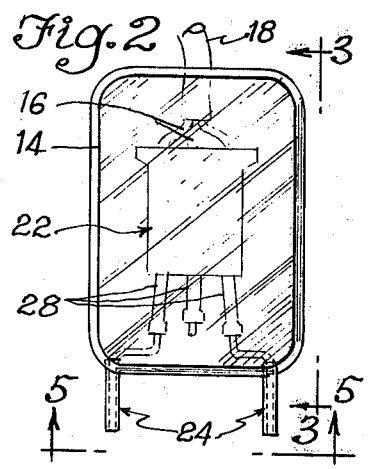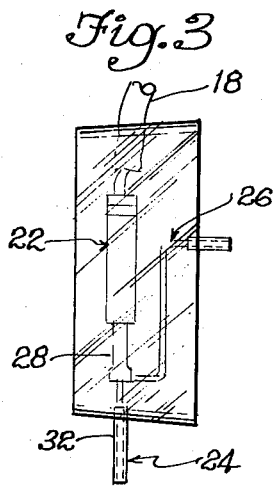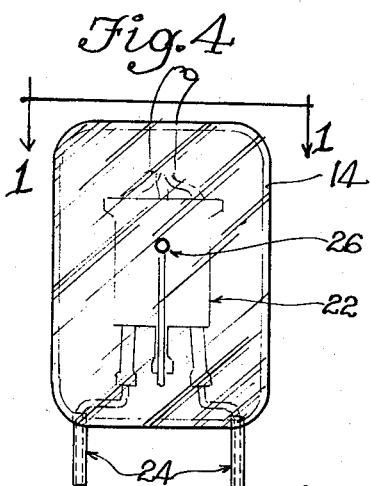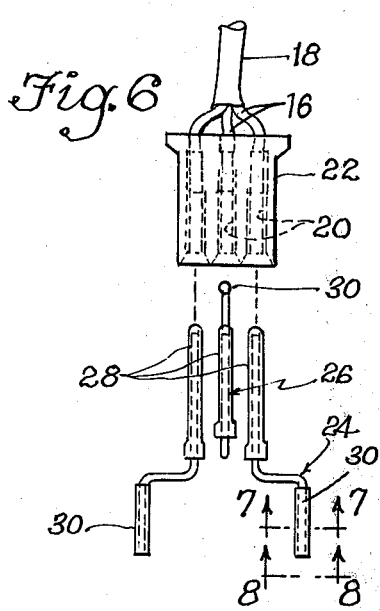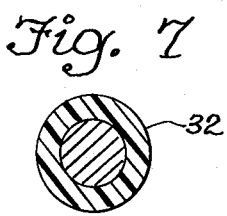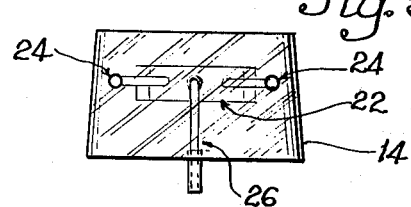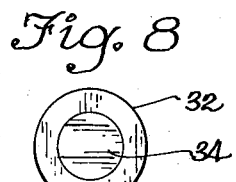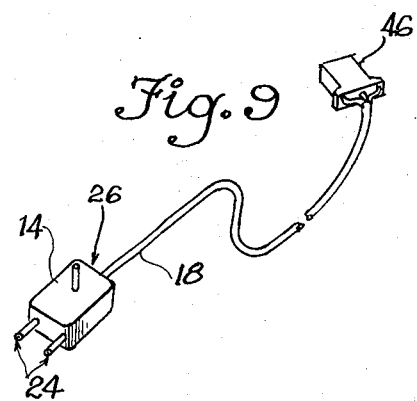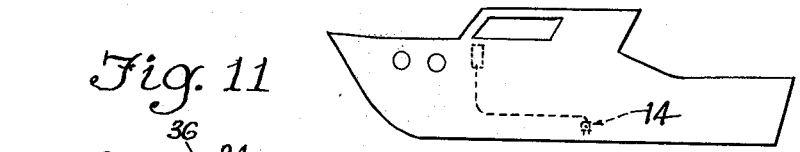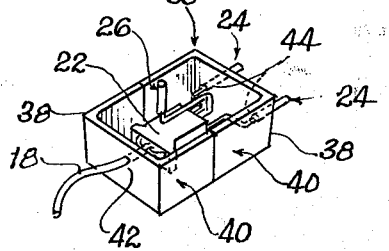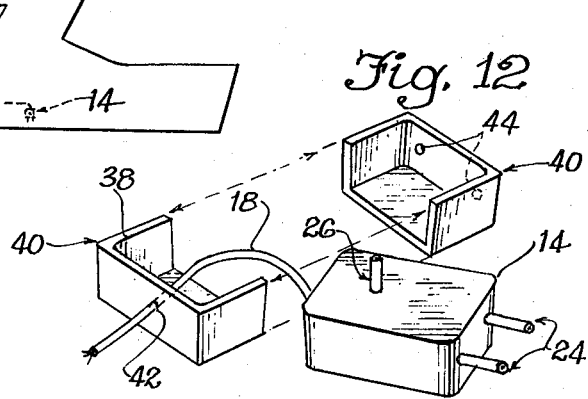

WATER LEVEL SENSOR

BACKGROUND OF THE INVENTION

It is a well known fact in nautical circles that many vessels sink on the high seas, and even sink alongside docks while those persons on board are asleep or otherwise uncognizant of the fact that the boat has leakage problems. The loss of property as well as lives from these incidents could almost always have been avoided had the persons on board been aware that the vessel was leaking before it was too late to do anything about it prior to capsizing.

Applicant's invention is directed toward sensing the water level in the bilge or other compartment of a boat and providing an accurate signal to a utilization means such as an alarm or bilge pump in the event water exceeds a certain level in the bilge.

Applicant is certainly not the first to address himself to this problem, and the literature, including issued patents, is replete with examples of other devices of various types utilizing different principles to sense a fluid level and sound an alarm or activates a pump in case of danger. Some of these devices utilize hinged floats or other moving parts which tend to corrode or otherwise become fouled in the marine environment and become unreliable, an occurrence that is often discovered too late. A few sensor units have been designed with no moving parts, utilizing the conductivity of the fluid to be sensed in contact with probes to activate the emergency systems. Applicant's sensor is of this type and provides a unique and well-designed three-probe sensor unit defining two triggering levels, the unit being especially designed to resist the corrosion and weather abuse that the sensor is susceptible to, and in addition, by the provision of a special water repellent material around the electrical probe elements, the likelihood of false alarms and undue emergency equipment operation resulting from the coating of the prongs with bilge debris is minimized. In addition, the system of alarms that applicant operates utilizing this sensor provides extremely low current in the microamp range for the detection of water in the bilge, thus eliminating any chance whatsoever of a spark-produced fire aboard the vessel despite the possible presence of floating fuel in the bilges.

SUMMARY OF THE INVENTION

The invention is a sensing device and a process for making same wherein three electrical elements are specially processed to coat one end thereof with an insulative, water repellent substance, and the other ends of the elements are inserted in a three-socket connector. The tips of the coated elements are snipped to expose the sensor conductors and lead wires run from the opposite side of the connector.

The connector is inserted in a two-part mold with lead wires penetrating through the wall of one half and a pair of the sensor probes extending through the other half. Hard-setting liquid such as extended polyurethane is poured into the open-topped mold, and subsequent to its setting the two mold halves are drawn off of the unit over the wire leads at one end and the two probes at the other end, leaving a solid block or body of rigid polyurethane material hermetically incapsulating the entire connector structure. Three probes are used, the two which penetrate the side wall of the mold and a third which is directed upwardly above the level of plastic in the mold, so that when the device is extracted from the mold as described above, and deployed with the lead wires extending unpward vertically, the two lower probes define one level and the third probe defines a level about one and one-half inches above the first level, so that when the lead wires are properly connected to a utilization means, emergency equipment turn-on can be effected upon the water level rising to the level of the upper probe, and the withdrawal of the water below the bottom two probes effects the deactivation of the emergency mechanism.

BRIEF DESCRIPTION OF THE DRAWING

FIG. 1 is a sectional view taken along line 1—1 of FIG. 4;

FIG. 2 is a rear elevation view of the sensor unit wherein the plastic body is transparent to reveal the inner structure;

FIG. 3 is an elevation view taken along line 3—3 of FIG. 2;

FIG. 4 is a front elevation view of the device;

FIG. 5 is a view taken along line 5—5 of FIG. 2;

FIG. 6 is an exploded elevation view, partially in section, of the connector and electrical element structure;

FIG. 7 is a section taken along line 7—7 of FIG. 6;

FIG. 8 is an end elevation view of a probe seen from line 8—8 of FIG. 6;

FIG. 9 is a perspective of the complete sensor unit;

FIG. 10 is a diagrammatic illustration of the unit mounted in a vessel showing its relation vis-a-vis emergency equipment;

FIG. 11 illustrates the connector in the mold ready for pouring the polyurethane; and FIG. 12 illustrates the separation of the two mold halves to free the polyurethane body.

DETAILED DESCRIPTION OF THE INVENTION

The operative portion of the invention is best seen overall in FIG. 2 wherein a polyurethane body 14 incapsulates and seals all of the internal structure, with the lead wires 16 exiting as a cable 18, with the interior distal ends being connected to conductor sockets 20 of the connector 22. As is best seen in FIG. 6, three metallic conductor elements are used, two of which as indicated at 24 are downwardly directed and a third, center element 26 is bent upwardly to project laterally of the polyurethane body 14 as is best seen in FIG. 3.

Each of these elements has an enlarged shank portion 28 which is received within the sockets 20 defined in the connector 22, and a terminal or probe portion 30, and a central portion in the conductor element which defines appropriate bends such that the probes 30 are appropriately positioned externally of the body 14.

Each of the conductor elements 24 and 26 is covered in a special process with a coating 32 of Epoxy. The Epoxy is not only extremely resistant to corrosion but provides an external surface much like Teflon to which liquids will not adhere, best facilitating the draining off of any liquid or oil slick which might be found in the bilge which would otherwise foul the unit. In the process of forming the coating 32, the probes 30 are specially treated to adapt the metallic surface to the application of the Epoxy, subsequent to which the probes are dipped in Epoxy. Because as can be seen in FIG. 2, the probes are covered with Epoxy all the way into the interior of the body 14, in order to provide a conductive surface from which to detect the presence of a fluid level, the ends of the probes are snipped to expose bare metal as shown in FIG. 8.

As can be seen in FIGS. 1 through 5, as well as FIG. 9, the unit when completed is completely solid so that it is not affected by water pressure, which could become a significant factor in the event a large leak developed which outdistanced, at least temporarily, the ability of the pumping system to bail. The polyurethane coupled with the coated probe elements are virtually impervious to any manner of chemical attack or corrosion, and as indicated above, the special, slick surface of the polyurethane and the coated probes mitigates against the fouling of the sensor with any debris or liquid found in the bilge. The flat bottom of the parallelepiped body 14 mitigates against the dripping of bilge matter onto the lower probe. Thus the unit is ideal for its intended marine use, although miriad other uses are clearly conceivable.

The manner in which the sensor is made is as follows. The connector 22 represents one of a number of different ways in which the lead wire 16 could be connected to the electrical elements 24 and 26 which define the probes. Even twisted wires would work, although not as safely or as neatly as the indicated connector. Whatever connector structure is used, it is suspended inside a mold 36 such that the central contact 26 has its probe upwardly extended, and the two end probes extending from the elements 24 are horizontal. The hold in half shells 38 and 40, with half shell 38 having a hole 42 through which passes the cable 18 containing the three lead wires. The other half shell 40 has a pair of holes 44 similar to hole 42 through which pass the probes of the elements 24. Thus, the half shells of the mold also serve as a jig to hold the connector 22 in spaced relation within the mold.

Once the connector has been suspended in this fashion, a hard-setting polyurethane is poured into the open-topped mold and allowed to set. Once it has set, the two halves are removed over the ends of the cable 18 and the contacts 24, respectively, as shown in FIG. 12. Once the mold halves have been removed, a second connector 46 is connected to the other ends of the lead wires 16 so that the unit is ready for attachment to a utilization system.

I claim:
1. A sensing device for determining the level of a fluid comprising:
   (a) an electrical connector connected to a lead cable with a three-wire breakout and defining three parallel downwardly directed sockets connected respectively to said three wires;
   (b) two pre-formed conductor elements plugged into two of said three sockets and defining respectively two depending probes each having an insulation sheath completely covering same except for the tip thereof;
   (c) a third pre-formed conductor element plugged into the third of said sockets and defining a horizontally extended probe having an insulation sheath completely covering same except for the tip thereof; and
   (d) a solid block of an insulating, impermeable mass completely encapsulating said connector and said conductor elements except for the ends of said probes so that the exterior surface of said block intersects the insulation sheaths of said probes and said cable beyond the three-wire breakout, whereby all elements extending from said block are imbedded in said block up to and beyond their areas of greatest insulation.

* * * * *